United States Patent
Wenger et al.

(10) Patent No.: US 12,414,579 B2
(45) Date of Patent: Sep. 16, 2025

(54) FOOD PROCESSING SYSTEM INCLUDING EXTRUDER WITH HOLLOW CORE SCREW ASSEMBLY

(71) Applicant: Wenger Manufacturing Inc., Sabetha, KS (US)

(72) Inventors: LaVon Wenger, Sabetha, KS (US); Allan C. Spellmeier, Fairview, KS (US); Philip B. Wiltz, Sabetha, KS (US)

(73) Assignee: Wenger Manufacturing Inc., Sabetha, KS (US)

( * ) Notice: Subject to any disclaimer, the term of this patent is extended or adjusted under 35 U.S.C. 154(b) by 1080 days.

(21) Appl. No.: 17/375,757

(22) Filed: Jul. 14, 2021

(65) Prior Publication Data

US 2021/0337831 A1 Nov. 4, 2021

Related U.S. Application Data

(60) Division of application No. 16/446,194, filed on Jun. 19, 2019, now Pat. No. 11,241,026, which is a
(Continued)

(51) Int. Cl.
*A23K 40/00* (2016.01)
*A23K 10/20* (2016.01)
(Continued)

(52) U.S. Cl.
CPC .............. *A23K 40/25* (2016.05); *A23K 10/20* (2016.05); *A23K 50/40* (2016.05); *A23N 17/002* (2013.01);
(Continued)

(58) Field of Classification Search
CPC . B01F 27/2721; A23N 17/002; A23N 17/004; A23N 17/007
See application file for complete search history.

(56) References Cited

U.S. PATENT DOCUMENTS

| 617,735 A | 1/1899 | Godfrey |
|---|---|---|
| 675,179 A | 5/1901 | Wacker |

(Continued)

FOREIGN PATENT DOCUMENTS

| CH | 193324 | 10/1937 |
|---|---|---|
| CN | 1456069 | 11/2003 |

(Continued)

OTHER PUBLICATIONS

Amruthraj, Bharath. "Design of Twin Screw Oil Expeller for Pongamia Pinnata Seeds." International Journal of Emerging Technology and Advance Engineering, 4:3 2014.
(Continued)

*Primary Examiner* — Anshu Bhatia
(74) *Attorney, Agent, or Firm* — Hovey Williams LLP

(57) ABSTRACT

Apparatus and methods for food production including a food preconditioner (228) operable to heat and partially pre-cook food ingredients, and a twin screw extruder (20) operable to further cook the preconditioned ingredients to create final food products. The extruder (20) includes a pair of hollow core extrusion screws (50, 52, 124, 126, 190) having elongated hollow core shafts (54, 128, 130, 192) equipped with helical fighting (56, 132, 134, 194) along the lengths thereof. The fighting (132, 134, 194) is also of hollow construction which communicates with the hollow core shafts (54, 128, 130, 192). The fighting (56, 132, 134, 194) also includes forward, reverse pitch sections (64, 162, 216). The extrusion screws (50, 52, 124, 126, 190) are designed to impart high levels of thermal energy into materials being processed in the extruders (20), without adding additional moisture.

17 Claims, 6 Drawing Sheets

Related U.S. Application Data continuation of application No. 15/699,642, filed on Sep. 8, 2017, now Pat. No. 10,434,483.

(60) Provisional application No. 62/459,215, filed on Feb. 15, 2017.

(51) Int. Cl.

| | | |
|---|---|---|
| *A23K 40/25* | (2016.01) | |
| *A23K 50/40* | (2016.01) | |
| *A23N 17/00* | (2006.01) | |
| *A23P 30/20* | (2016.01) | |
| *B01F 27/1143* | (2022.01) | |
| *B01F 27/2121* | (2022.01) | |
| *B01F 27/2122* | (2022.01) | |
| *B01F 27/27* | (2022.01) | |
| *B01F 27/272* | (2022.01) | |
| *B01F 27/722* | (2022.01) | |
| *B01F 27/723* | (2022.01) | |
| *B01F 27/726* | (2022.01) | |
| *B01F 35/95* | (2022.01) | |
| *B29C 48/40* | (2019.01) | |
| *B29C 48/84* | (2019.01) | |
| *B01F 35/90* | (2022.01) | |
| *B01F 101/18* | (2022.01) | |

(52) U.S. Cl.
CPC ......... *A23N 17/004* (2013.01); *A23N 17/007* (2013.01); *A23P 30/20* (2016.08); *B01F 27/1143* (2022.01); *B01F 27/2121* (2022.01); *B01F 27/2122* (2022.01); *B01F 27/2721* (2022.01); *B01F 27/2722* (2022.01); *B01F 27/276* (2022.01); *B01F 27/722* (2022.01); *B01F 27/723* (2022.01); *B01F 27/726* (2022.01); *B01F 35/95* (2022.01); *B29C 48/402* (2019.02); *B29C 48/845* (2019.02); *B01F 2035/99* (2022.01); *B01F 2101/18* (2022.01)

(56) References Cited

U.S. PATENT DOCUMENTS

| | | | |
|---|---|---|---|
| 1,762,368 A | 6/1930 | Vandergrift | |
| 1,972,929 A | 9/1934 | Fisher | |
| 2,027,185 A | 1/1936 | Loomis | |
| 2,136,264 A | 11/1938 | Kiesskalt et al. | |
| 2,233,898 A | 3/1941 | Christian | |
| 2,321,185 A | 6/1943 | Christian | |
| 2,321,285 A | 6/1943 | Ehret et al. | |
| 2,458,068 A | 1/1949 | Fuller | |
| 2,567,219 A | 9/1951 | Lesniak | |
| 2,624,552 A | 1/1953 | Rose | |
| 2,722,716 A | 11/1955 | Henning | |
| 2,731,241 A | 1/1956 | Christian | |
| 2,753,159 A | 7/1956 | Christian | |
| 2,883,163 A | 4/1959 | Solheim | |
| 3,020,025 A | 2/1962 | O'Mara | |
| 3,021,782 A | 2/1962 | Ginaven | |
| 3,143,768 A | 8/1964 | Scherping | |
| 3,191,229 A | 6/1965 | Vanzo | |
| 3,255,814 A | 6/1966 | Zimmermann et al. | |
| 3,259,374 A | 7/1966 | Doebl et al. | |
| 3,285,330 A | 11/1966 | Root | |
| 3,325,864 A | 6/1967 | Kohyama et al. | |
| 3,367,126 A | 2/1968 | Howell | |
| 3,386,131 A | 6/1968 | Vanzo | |
| 3,386,708 A | 6/1968 | Christian | |
| 3,395,805 A | 8/1968 | Holden | |
| 3,398,900 A | 8/1968 | Guba et al. | |
| 3,407,080 A | 10/1968 | Rainwater et al. | |
| 3,426,838 A | 2/1969 | Onarheim | |
| 3,450,537 A | 6/1969 | Filstrup | |
| 3,461,793 A | 8/1969 | Solberg | |
| 3,486,740 A | 12/1969 | Christian | |
| 3,500,901 A | 3/1970 | Root, III, et al. | |
| 3,529,661 A | 9/1970 | Yousch | |
| 3,548,926 A * | 12/1970 | Archer | B65G 33/18 165/92 |
| 3,563,710 A | 2/1971 | Dew, Jr. et al. | |
| 3,565,403 A | 2/1971 | Matsuoka | |
| 3,580,389 A | 5/1971 | Nonnenmacher | |
| 3,594,190 A | 7/1971 | Eslinger et al. | |
| 3,596,712 A | 8/1971 | Matsuoka et al. | |
| 3,613,722 A | 10/1971 | Nara | |
| 3,637,069 A | 1/1972 | Christian et al. | |
| 3,688,837 A | 9/1972 | Ocker | |
| 3,698,541 A | 10/1972 | Barr | |
| 3,738,420 A | 6/1973 | Poux et al. | |
| 3,764,062 A | 10/1973 | Brautigam | |
| 3,764,118 A | 10/1973 | Matsuoka | |
| 3,765,481 A | 10/1973 | Root | |
| 3,776,529 A | 12/1973 | Sutter et al. | |
| 3,800,865 A | 4/1974 | Onarheim et al. | |
| 3,802,670 A | 4/1974 | Okada et al. | |
| 3,856,278 A | 12/1974 | Eisenmann | |
| 3,923,097 A | 12/1975 | Hovad | |
| 3,976,799 A | 8/1976 | Kelly et al. | |
| 4,004,129 A | 1/1977 | Hicks | |
| 4,022,915 A | 5/1977 | Zukerman | |
| 4,040,768 A | 8/1977 | Christian | |
| 4,125,945 A | 11/1978 | Westelaken | |
| 4,134,714 A | 1/1979 | Driskill | |
| 4,183,674 A | 1/1980 | Sudo et al. | |
| 4,183,676 A | 1/1980 | Engels et al. | |
| 4,185,123 A | 1/1980 | Wenger et al. | |
| 4,233,676 A | 11/1980 | Luecke et al. | |
| 4,330,562 A | 5/1982 | Nassar | |
| 4,372,734 A | 2/1983 | Dolan et al. | |
| 4,393,983 A | 7/1983 | Eriksson | |
| 4,408,888 A | 10/1983 | Hanslik | |
| 4,425,962 A | 1/1984 | Cameron | |
| 4,438,691 A | 3/1984 | Solberg | |
| 4,457,227 A | 7/1984 | Koch | |
| 4,542,686 A | 9/1985 | Bansal | |
| 4,565,124 A | 1/1986 | Stautland et al. | |
| 4,636,127 A | 1/1987 | Olano et al. | |
| 4,642,241 A | 2/1987 | Noguchi | |
| 4,698,310 A | 10/1987 | Wikholm et al. | |
| 4,729,902 A | 3/1988 | Urman et al. | |
| 4,818,206 A | 4/1989 | Maillefer | |
| 4,856,580 A | 8/1989 | Ley | |
| 4,868,002 A | 9/1989 | Scaglione et al. | |
| 4,910,038 A | 3/1990 | Ducharme | |
| 4,935,183 A | 6/1990 | Wenger et al. | |
| 5,074,057 A | 12/1991 | Kanai | |
| 5,120,559 A * | 6/1992 | Rizvi | A21D 8/02 426/549 |
| 5,135,355 A | 8/1992 | Colley et al. | |
| 5,232,280 A | 8/1993 | Moriyama | |
| 5,242,292 A | 9/1993 | Wenger | |
| 5,252,351 A | 10/1993 | Cox et al. | |
| 5,333,556 A | 8/1994 | Isobe et al. | |
| 5,350,585 A | 9/1994 | Sunderland | |
| 5,357,855 A | 10/1994 | Ishigaki et al. | |
| 5,372,418 A | 12/1994 | Biesenberger et al. | |
| 5,410,984 A | 5/1995 | Pikus et al. | |
| 5,417,155 A | 5/1995 | Tatsuzawa et al. | |
| 5,417,492 A | 5/1995 | Christian et al. | |
| 5,431,927 A | 7/1995 | Hand et al. | |
| 5,500,239 A | 3/1996 | Hayward | |
| 5,547,277 A | 8/1996 | Caspelherr et al. | |
| 5,628,560 A | 5/1997 | Eigruber | |
| 5,635,237 A * | 6/1997 | Greenberg | A23P 30/20 426/805 |
| 5,694,833 A | 12/1997 | Wenger | |
| 5,695,797 A | 12/1997 | Geromini et al. | |
| 5,718,508 A | 2/1998 | Williams | |
| 5,743,178 A | 4/1998 | Babbini | |
| 5,750,158 A | 5/1998 | Wissmann et al. | |
| 5,863,197 A | 1/1999 | Boy et al. | |

(56) References Cited

U.S. PATENT DOCUMENTS

| | | | |
|---|---|---|---|
| 5,887,972 A | 3/1999 | Dickmeiss et al. |
| 5,894,029 A | 4/1999 | Brown et al. |
| 5,894,803 A | 4/1999 | Kuga |
| 5,964,278 A | 10/1999 | Langoy et al. |
| 5,997,934 A | 12/1999 | Geromini et al. |
| 6,099,159 A | 8/2000 | Yoshida et al. |
| 6,099,288 A | 8/2000 | Long |
| 6,105,490 A | 8/2000 | Horn et al. |
| 6,170,168 B1 | 1/2001 | Fosbøl et al. |
| 6,234,661 B1 | 5/2001 | Thewes |
| 6,238,726 B1 | 5/2001 | Fischer |
| 6,410,079 B2 | 6/2002 | Cheuk et al. |
| 6,550,376 B2 | 4/2003 | Johnston |
| 6,609,819 B2 | 8/2003 | Hauck et al. |
| 6,688,217 B2 | 2/2004 | Hauck et al. |
| 6,805,480 B1 | 10/2004 | Behling |
| 7,097,345 B2 | 8/2006 | Ueda et al. |
| 7,191,700 B2 | 3/2007 | Sasaki |
| 7,322,738 B2 | 1/2008 | Yamane et al. |
| 7,448,795 B2 | 11/2008 | Wenger et al. |
| 7,521,076 B1 | 4/2009 | Wenger et al. |
| 7,632,006 B2 | 12/2009 | Schulz |
| 7,731,879 B2 | 6/2010 | Winter et al. |
| 8,079,747 B2 | 12/2011 | Ek et al. |
| 8,118,479 B2 | 2/2012 | van Elderen et al. |
| 8,151,482 B2 | 4/2012 | Moss et al. |
| 8,444,828 B2 | 5/2013 | Wolfe |
| 8,496,985 B2 | 7/2013 | Langford |
| 8,596,856 B2 | 12/2013 | Chang |
| 8,647,690 B2 | 2/2014 | Corrigan |
| 8,944,672 B2 | 2/2015 | Wenger et al. |
| 8,999,422 B2 | 4/2015 | Wenger et al. |
| 9,004,152 B2 | 4/2015 | Yoshihara et al. |
| 9,045,693 B2 | 6/2015 | Wolfe |
| 9,316,439 B2 | 4/2016 | Tucker |
| 9,321,190 B2 | 4/2016 | Martel et al. |
| 9,908,090 B2 | 3/2018 | VanDalsem et al. |
| 10,434,483 B2 | 10/2019 | Wenger et al. |
| 10,555,547 B2 | 2/2020 | Wenger et al. |
| 10,624,369 B2 | 4/2020 | Wenger et al. |
| 10,624,382 B2 | 4/2020 | Wenger et al. |
| 10,736,340 B1 | 8/2020 | Rokey et al. |
| 10,893,688 B2 | 1/2021 | Wenger et al. |
| 11,039,629 B2 | 6/2021 | Wenger et al. |
| 11,241,026 B2 | 2/2022 | Wenger et al. |
| 2001/0053405 A1 | 12/2001 | Cheuk et al. |
| 2002/0119241 A1 | 8/2002 | Speck et al. |
| 2002/0122850 A1 | 9/2002 | Kartchner |
| 2002/0192341 A1 | 12/2002 | Pope et al. |
| 2003/0021860 A1 | 1/2003 | Clock et al. |
| 2004/0086616 A1 | 5/2004 | Nie et al. |
| 2004/0234641 A1* | 11/2004 | Ueda ............... B29C 48/252 425/204 |
| 2005/0219943 A1 | 10/2005 | Yamane et al. |
| 2005/0220979 A1 | 10/2005 | Baumer et al. |
| 2006/0210695 A1 | 9/2006 | Ganjyal |
| 2007/0077336 A1 | 4/2007 | Fulcher et al. |
| 2007/0163966 A1 | 7/2007 | Hilgren et al. |
| 2008/0069916 A1 | 3/2008 | Regalia |
| 2008/0095910 A1* | 4/2008 | Wenger ............ B01F 35/22142 366/132 |
| 2008/0248167 A1 | 10/2008 | McMindes et al. |
| 2009/0068336 A1 | 3/2009 | Torney et al. |
| 2009/0098267 A1 | 4/2009 | Pettelot et al. |
| 2009/0213681 A1 | 8/2009 | Ek et al. |
| 2009/0263564 A1 | 10/2009 | Kang et al. |
| 2009/0297664 A1 | 12/2009 | Forte et al. |
| 2009/0324790 A1 | 12/2009 | Hilgren et al. |
| 2011/0262609 A1 | 10/2011 | Wenger et al. |
| 2012/0237642 A1 | 9/2012 | Gardewin |
| 2013/0264264 A1 | 10/2013 | Lehoux et al. |
| 2014/0027095 A1 | 1/2014 | Warchol et al. |
| 2014/0087044 A1* | 3/2014 | Wenger ............ A23K 40/20 426/465 |
| 2015/0020695 A1 | 1/2015 | Wenger |
| 2015/0131399 A1 | 5/2015 | Brunner et al. |
| 2015/0173384 A1 | 6/2015 | Oustric et al. |
| 2015/0181907 A1 | 7/2015 | Baumer et al. |
| 2016/0219904 A1 | 8/2016 | Reynes |
| 2016/0330998 A1 | 11/2016 | Jimenez-Marquez et al. |
| 2017/0013848 A1 | 1/2017 | Jorgensen et al. |
| 2017/0042164 A1 | 2/2017 | Maeda |
| 2017/0367369 A1 | 12/2017 | Rodriguez et al. |
| 2018/0214833 A1 | 8/2018 | Kashima et al. |
| 2018/0228183 A1 | 8/2018 | Wenger et al. |
| 2018/0229197 A1 | 8/2018 | Wenger et al. |
| 2019/0075822 A1 | 3/2019 | Wenger et al. |
| 2019/0233316 A1 | 8/2019 | Miller et al. |
| 2019/0247813 A1 | 8/2019 | Wenger et al. |
| 2019/0299178 A1 | 10/2019 | Wenger et al. |
| 2019/0299179 A1 | 10/2019 | Wenger et al. |
| 2019/0364929 A1 | 12/2019 | Wenger et al. |
| 2020/0060308 A1 | 2/2020 | Manchuliantsau et al. |
| 2020/0068020 A1 | 2/2020 | O'Sullivan et al. |
| 2020/0113222 A1 | 4/2020 | Wenger et al. |
| 2020/0120970 A1 | 4/2020 | Rokey et al. |
| 2021/0068424 A1 | 3/2021 | Rokey et al. |
| 2021/0337831 A1 | 11/2021 | Wenger et al. |

FOREIGN PATENT DOCUMENTS

| | | |
|---|---|---|
| CN | 101103825 A | 1/2008 |
| CN | 101531054 A | 9/2009 |
| CN | 201439223 U | 4/2010 |
| CN | 102225317 A | 10/2011 |
| CN | 102275285 A | 12/2011 |
| CN | 202062635 U | 12/2011 |
| CN | 102490340 A | 6/2012 |
| CN | 104171487 A | 12/2014 |
| CN | 105476051 | 4/2016 |
| CN | 105559118 A | 5/2016 |
| CN | 205528350 U | 8/2016 |
| CN | 106418615 A | 2/2017 |
| CN | 106490668 | 3/2017 |
| CN | 206724651 U | 12/2017 |
| DE | 10113949 A1 | 9/2002 |
| EP | 0041641 A2 | 5/1981 |
| EP | 0184930 A1 | 6/1986 |
| EP | 0358837 B2 | 7/2003 |
| EP | 1479504 (1 A1 | 11/2004 |
| EP | 2146147 A2 | 1/2010 |
| EP | 2499922 A1 | 9/2012 |
| EP | 2810560 A1 | 12/2014 |
| FR | 2477429 A1 | 9/1981 |
| GB | 1525121 | 9/1978 |
| JP | 1986(S61)158885 A | 7/1986 |
| JP | 1990(H2)251397 A | 10/1990 |
| JP | 2004338343 (1 A | 12/2004 |
| JP | 2005506062 (2 A | 3/2005 |
| JP | 2015514006 A | 5/2015 |
| JP | 2015116581 A | 6/2015 |
| KR | 1020040027873 | 4/2004 |
| RU | 2013111266 A | 9/2014 |
| WO | 9314921 A1 | 8/1993 |
| WO | 9803088 A2 | 1/1998 |
| WO | 9947000 A1 | 9/1999 |
| WO | 2003009982 (2 A2 | 2/2003 |
| WO | 2004080704 A1 | 9/2004 |
| WO | 2010138372 A2 | 12/2010 |
| WO | 2014168763 A1 | 10/2014 |
| WO | 2018152346 A1 | 8/2018 |
| WO | 2019182630 A1 | 9/2019 |

OTHER PUBLICATIONS

Baldwin. "Adding flexibility to the extrusion process." Animal Feed, 2007.

Extended European Search Report in EP18910550.5 (PCT/US18/40449), dated Oct. 7, 2021.

Extended European Search Report in EP 18753775.8 (PCT/US2018/018396), dated Mar. 17, 2020.

Extended European Search Report in EP 18753587.7 (PCT/US2018/018398), dated Mar. 11, 2020.

(56) References Cited

OTHER PUBLICATIONS

International Search Report and Written Opinion in PCT/US2018/018396 dated May 31, 2018.
International Search Report and Written Opinion in PCT/US2018/018398, dated Jun. 1, 2018.
International Search Report and Written Opinion in PCT/US18/40449, dated Nov. 9, 2018.
International Search Report and Written Opinion in PCT/US19/53371, dated Jan. 17, 2020.
International Search Report and Written Opinion in PCT/US21/52333 dated Jan. 5, 2022.
JSW brochure, Twin Screw Extruder, 2014.
Lawal et al. "Mechanisms of Mixing in Single and Co-Rotating Twin Screw Extruders." Polymer Engineering and Science, 35:17 1995.
MLA Report, Evaluation and development of high moisture extruded red meat trim products, 2011.
Office Action in U.S. Appl. No. 15/699,642 dated May 10, 2019.
Office Action in U.S. Appl. No. 15/699,642 dated Jun. 3, 2019.
Office Action in U.S. Appl. No. 15/840,926 dated Aug. 13, 2019.
Office Action in U.S. Appl. No. 15/840,926 dated Nov. 4, 2019.
Office Action in U.S. Appl. No. 16/024,351 dated Mar. 25, 2020.
Office Action in U.S. Appl. No. 16/446,142 dated Sep. 9, 2020.
Office Action in U.S. Appl. No. 16/446,142 dated Oct. 2, 2020.
Office Action in U.S. Appl. No. 16/446,142 dated Oct. 30, 2020.
Office Action in U.S. Appl. No. 16/393,228 dated Nov. 20, 2020.
Rokey et al. "Pet Food Extrusion" presentation. 68th Reciprocal Meat Conference, 2015.
Schneider. "Conical and Counter-Rotating: The Length Makes the Difference." Kunststoffe international 2012.
Wenger Manufacturing Inc. PowerPoint Presentation entitled "Jerky Long Goods".
Office Action in U.S. Appl. No. 16/716,758 dated Sep. 29, 2022.
Office Action in U.S. Appl. No. 16/716,758 dated Dec. 8, 2023.
"Gentle 2-stage Drying" LARSSON Whirl Flash™ dryer http://www.larssonsweden.com/wp-content/uploads/2016/06/DO0046001-A2.1-EN-Whirl-Flash-Dryer.pdf (Accessed Apr. 23, 2018).
"Production plants from a single source." Aquafeed. https://www.buhlergroup.com/china/zh/downloads/Aquafeed.pdf (Accessed Apr. 23, 2018).
Ariyawansa, Sujeewa. "The evaluation of functional properties of fish meal."—United Nations University, Fisheries Training Programme, Project Final, Sri Lanka-125 (2000). pp. 10 and 14.
"SBX Master Preconditioner". Available online at https:/Avww.bakerperkinsgroup.com/food-extrusion/equipment/extrusion-co-extrusion/sbx-master-preconditioner (Year: 2017).
Office Action in U.S. Appl. No. 16/716,758 dated May 25, 2023.
"Stabilization of meat suspensions by organogelation: A rheological approach" Eur. J. Lipid Sci. Technol. 2012, 114, 1381-1389 (Year: 2012).

\* cited by examiner

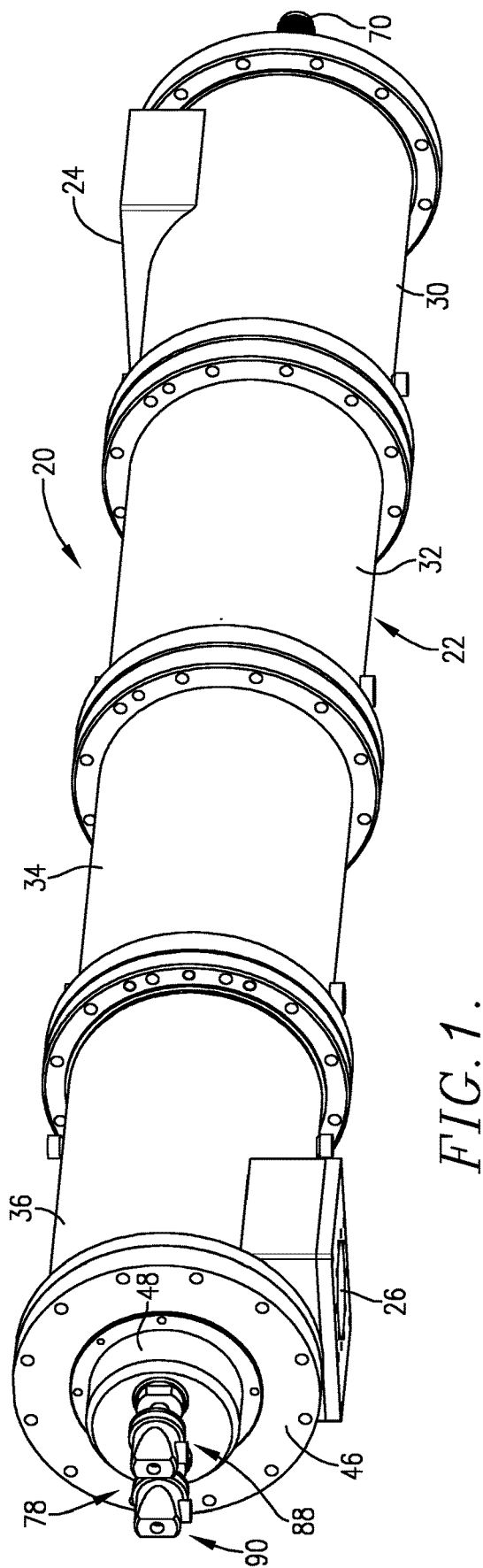
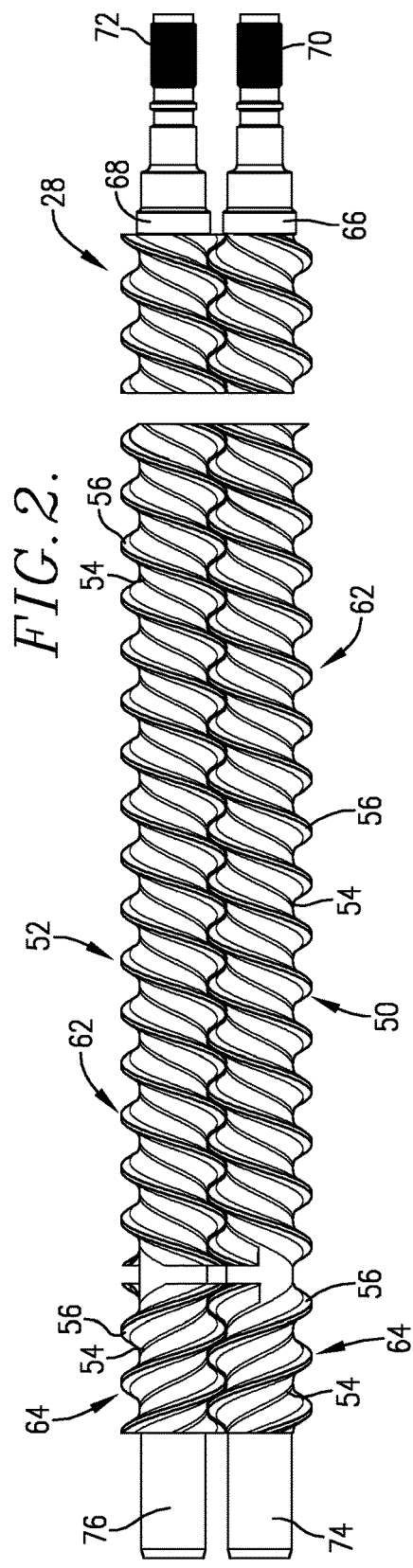
FIG. 1.
FIG. 2.

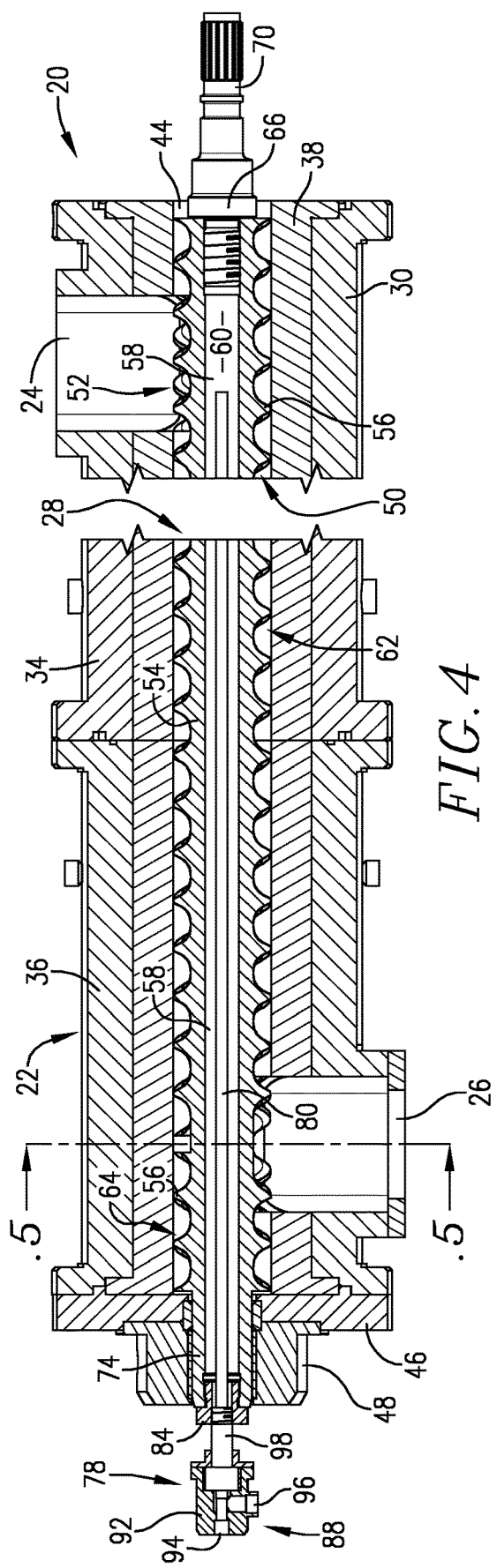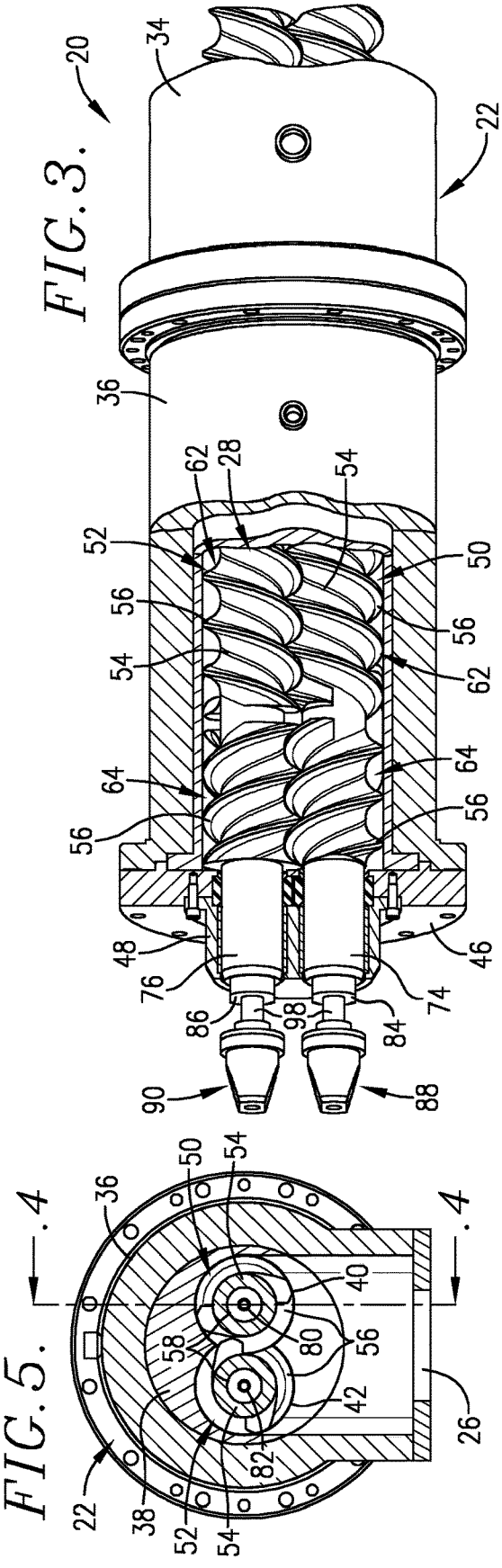

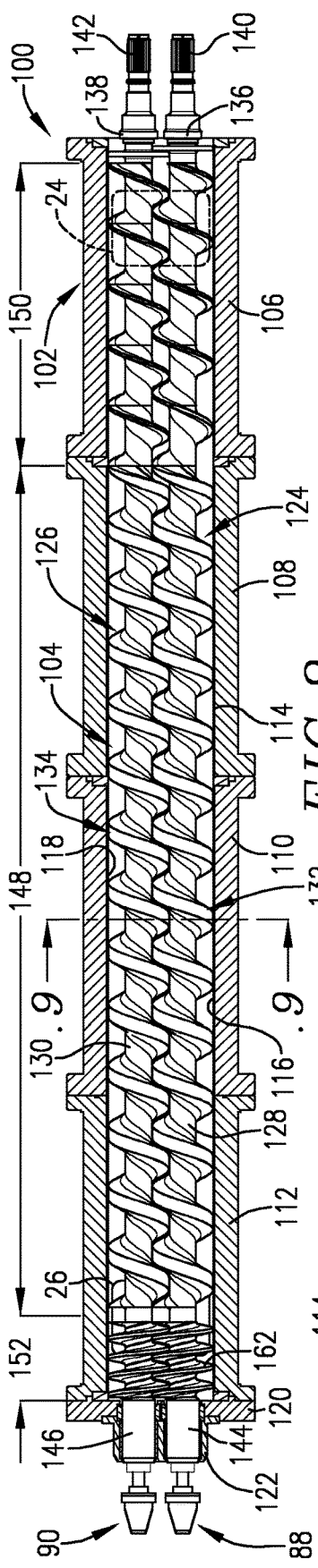
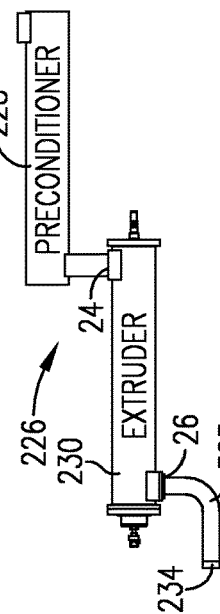
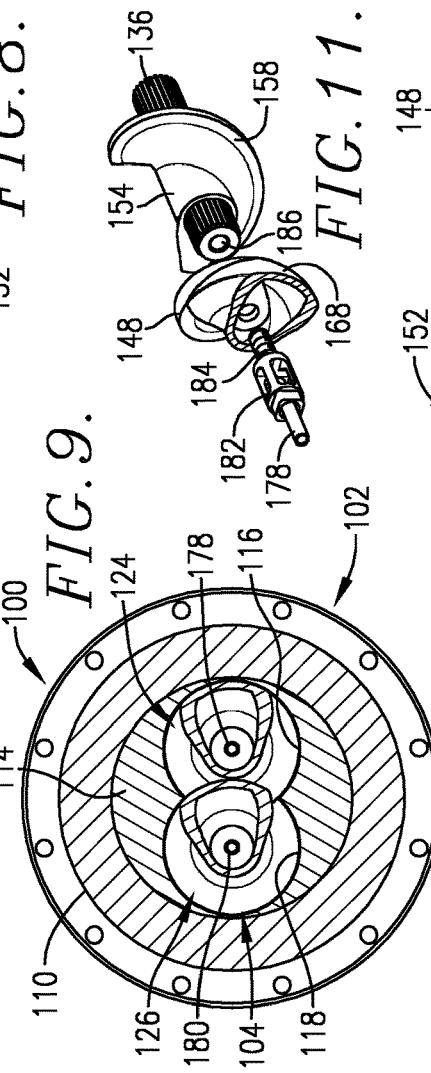
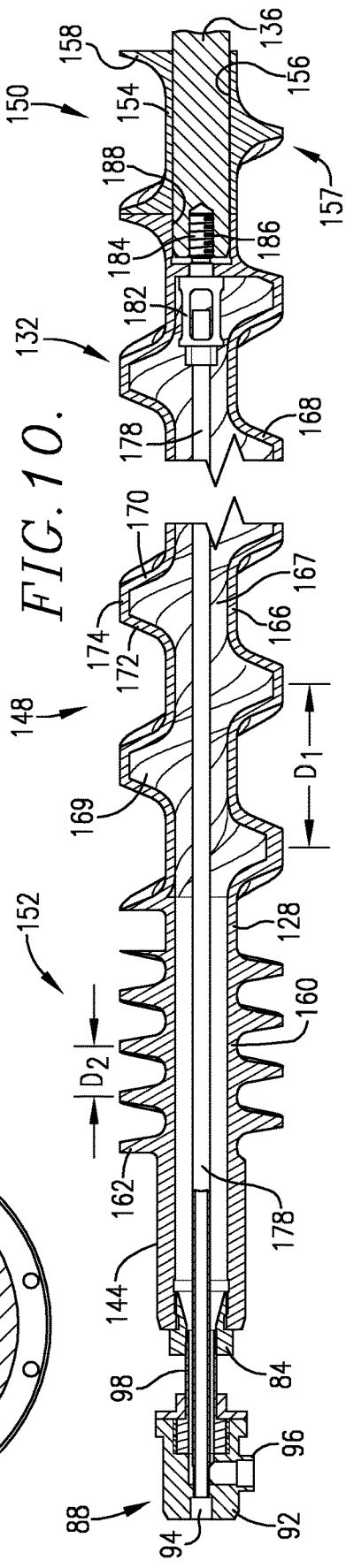

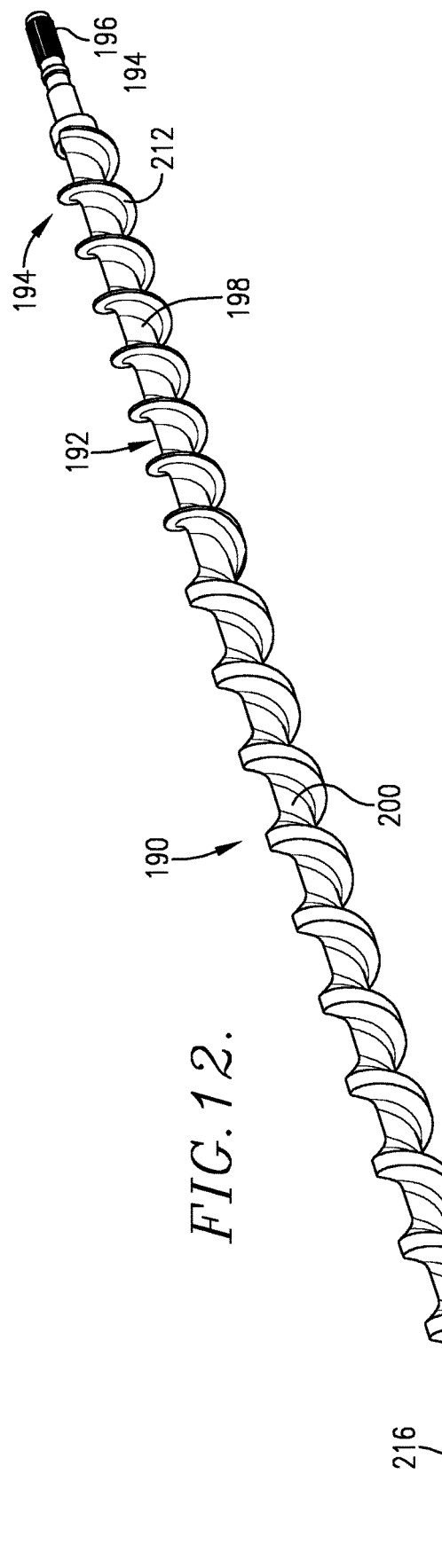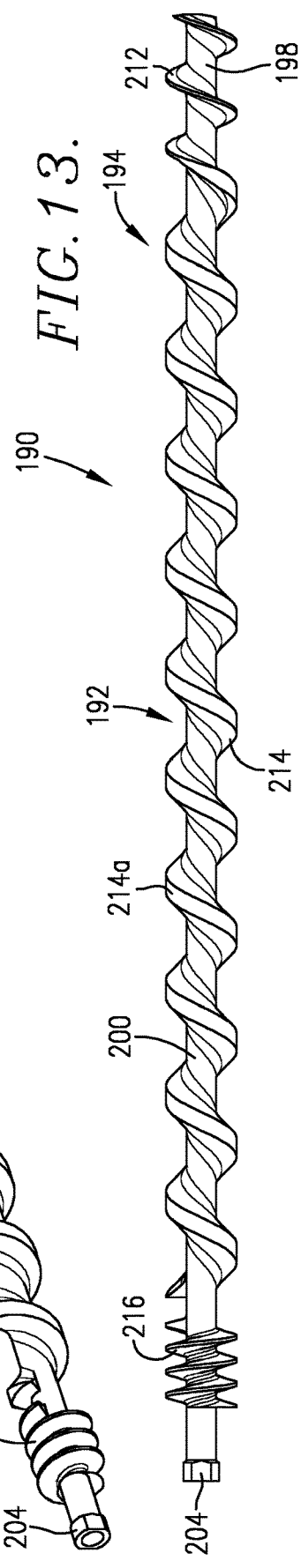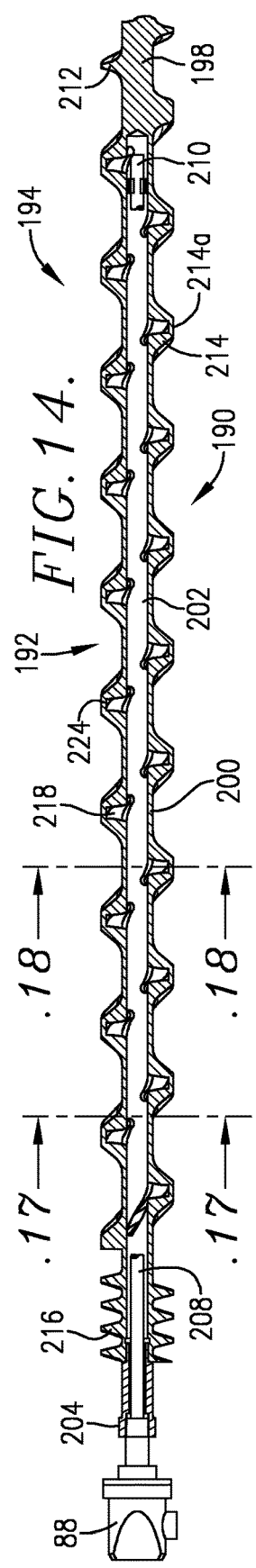

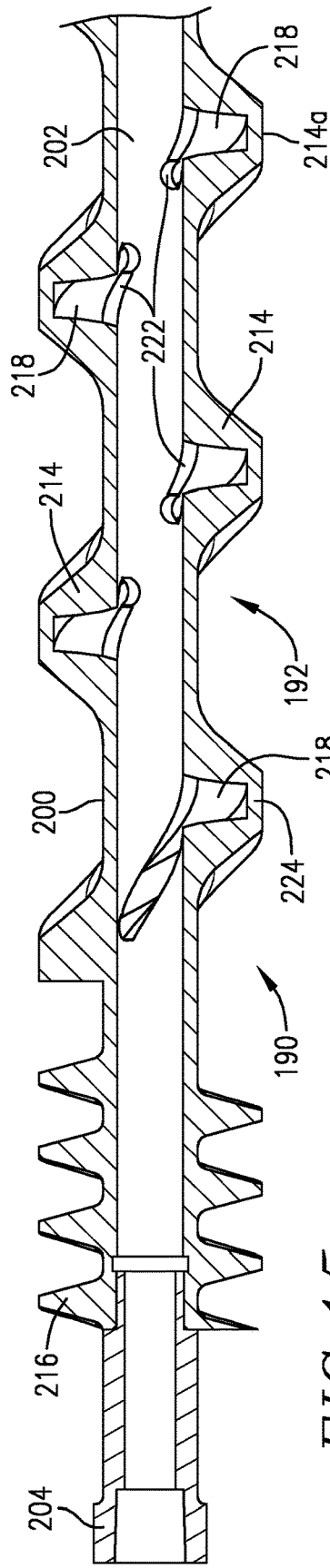
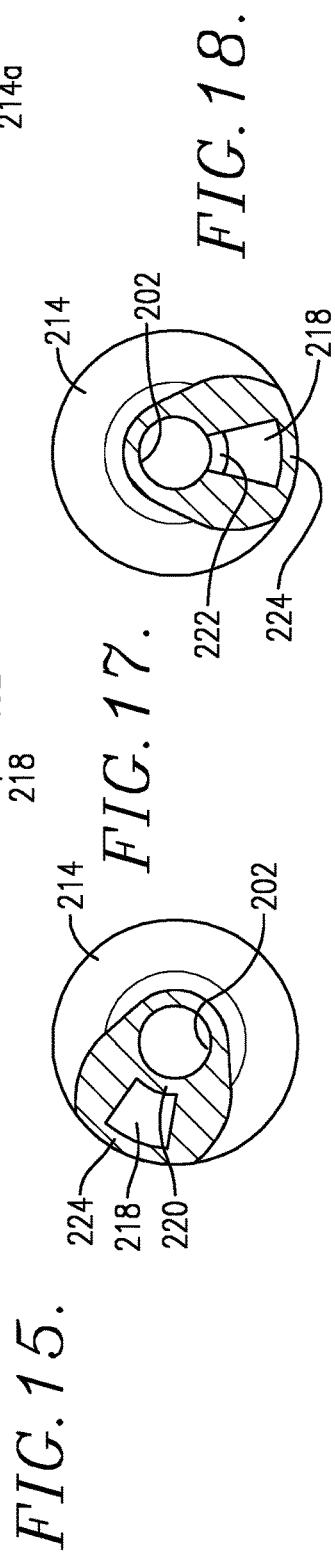
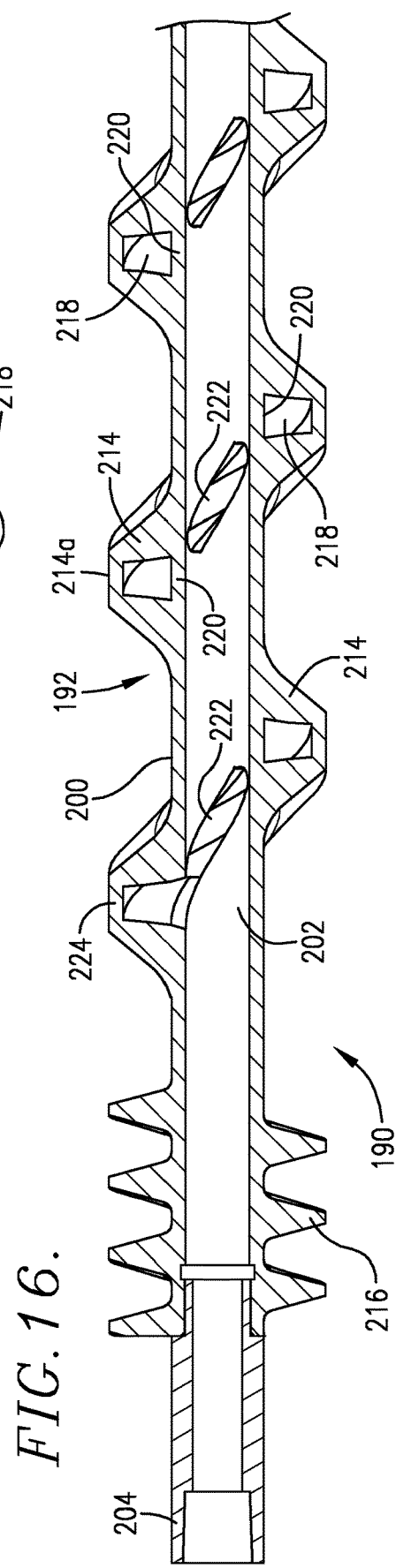

FOOD PROCESSING SYSTEM INCLUDING EXTRUDER WITH HOLLOW CORE SCREW ASSEMBLY

CROSS-REFERENCE TO RELATED APPLICATION

This application is a division of U.S. application Ser. No. 16/446,194 filed Jun. 19, 2019, which is a continuation of U.S. application Ser. No. 15/699,642 filed Sep. 8, 2017 (now U.S. Pat. No. 10,434,483 issued Oct. 8, 2019), which claims the benefit of provisional application Ser. No. 62/459,215, filed Feb. 15, 2017, each of which is incorporated by reference herein in its entirety.

BACKGROUND OF THE INVENTION

Field of the Invention

The present invention is broadly concerned with high thermal transfer, twin screw processing devices (e.g., extruders), which can be used in the production of comestible products having high meat contents. More particularly, the invention is concerned with such devices, as well as the twin screws therein, which provide very high thermal energy inputs without the need for direct injection of steam into the materials being processed. This is obtained by unique, hollow core, high thermal transfer screw designs which are equipped with steam injection apparatus for indirect heating of materials during processing thereof.

Description of the Prior Art

Many pet foods are produced using extrusion technology, where in mixtures containing grains, starches, fats, and other ingredients are initially preconditioned to heat and partially cook the mixtures, followed by processing through a single or twin screw extruder. Preconditioning involves passage of the initially dry mixture into an elongated housing where it is mixed with injected steam and/or water, making the mixture better conditioned for downstream extrusion. During extrusion, it is common to inject still further quantities of steam and/or water into the mixture during passage through the extruder barrel. For many product recipes, this existing technology is satisfactory. However, in recent years, producers have sought to incorporate greater and greater quantities of fresh meat into the feed recipes. At relatively low levels of meat addition, the traditional extrusion processing technologies are suitable. However, when attempts are made to incorporate high levels of meat (e.g., greater than about 40% by weight), standard preconditioner/extruder equipment may not be adequate. One issue is that fresh meat products are very high in moisture, and thus the usual steps of moisture addition into the preconditioner and/or extruder renders the product too wet for successful extrusion.

The following references are of interest: U.S. Pat. Nos. 3,255,814, 3,259,374, 3,386,708, 3,637,069, 3,776,529, 4,040,768, 4,372,734, 5,074,057, 5,547,277, 6,099,159, and 9,321,190, and French Patent No. FR2477429.

SUMMARY OF THE INVENTION

The present invention overcomes the problems outlined above and provides twin screw processing devices, preferably but not necessarily in the form of extruders, having restricted orifice die structures. Generally speaking, the processing devices of the invention include an elongated barrel having a material inlet and a processed material outlet, with a pair of elongated, intermeshed, axially rotatable, helical screws within and extending along the length of the barrel. Each of the screws has an elongated shaft with a hollow core and an elongated helical fighting section extending outwardly from the shaft, with the hollow core configured to receive heat exchange media. The devices also include a media delivery assembly having a pair of media delivery tubes extending from a point outside of the barrel and respectively into a corresponding one of the hollow cores; structure such as rotary unions is operably coupled with the delivery tubes so as to supply media to the tubes for delivery into the hollow cores.

In preferred forms, each of the helical screws has a first helically flighted section operable to convey material from the material inlet toward and through the processed material outlet, and a second helically flighted section proximal to the processed material outlet, which is operable to retard the flow of material therepast, with the first and second helically flighted sections being of opposite hand. In such designs, it is preferably that the flow-retarding second helical section has a pitch length less than the pitch length of the first helical section.

In order to provide the greatest degree of heat transfer from the hollow core screws, the latter are designed with a central section, which may be of integral, cast construction, with both a hollow core and a hollow screw in communication with each other. In an embodiment, the helical screw of the central section has a pair of opposed, spaced apart wall segments extending outwardly from the shaft and presenting a helical transition area between the opposed wall segments. This transition area is open throughout the length and width thereof to afford unobstructed communication between the hollow core and hollow screw. Moreover, the thickness of the hollow shaft and the hollow screw are substantially equal.

The screws of the invention typically have an elongated, axially rotatable shaft with a hollow core and presenting a rear connection end operable to couple the screw with a drive, and forward bearing structure at the opposite end of the shaft. An axial bore extends through the forward end of the shaft, permitting insertion of a heat exchange media delivery tube through the bore and into the hollow core. Furthermore, the screws have elongated, helical fighting extending outwardly from the shaft along the length thereof, the fighting including a first section and a second, shorter section. The first and second fighting sections are of opposite hand, with the second section located between the first section and the bearing structure, and have an axial length at least about three times greater than the axial length of the second section.

In another embodiment, the screws are manufactured with an inwardly extending helical, open-top groove along the length of the fighting, thereby defining a bottom wall between the groove and the shaft core. A plurality of spaced apart apertures are provided through the bottom wall or cover piece in order to communicate the helical groove and the shaft core, and the groove open top is closed using a welded-in-place helical cover.

BRIEF DESCRIPTION OF THE DRAWINGS

FIG. 1 is a perspective view of a twin screw processing device in accordance with the invention;

FIG. 2 is a fragmentary view of the twin screw assembly forming a part of the device of FIG. 1;

FIG. 3 is a fragmentary view with parts broken away of the forward outlet end of the device of FIG. 1, depicting the reverse flight sections of the twin screws;

FIG. 4 is a partial vertical section taken along line 4-4 of FIG. 5, illustrating the internal construction of the processing device;

FIG. 5 is a vertical sectional view taken along line 5-5 of FIG. 4;

FIG. 8 is a sectional view of the device of FIG. 6, illustrating the full configuration of the twin screw assembly thereof;

FIG. 9 is a vertical sectional view taken along line 9-9 of FIG. 8;

FIG. 10 is a partial sectional view illustrating the hollow shaft/hollow helix construction of the twin screws of the device of FIG. 1;

FIG. 11 is a fragmentary, perspective, exploded view illustrating the drive connection and steam diffuser forming a part of the twin screw assembly of the FIG. 6 embodiment;

FIG. 12 is a perspective view of another hollow core screw embodiment in accordance with the invention;

FIG. 13 is a fragmentary elevational view of the screw of FIG. 12;

FIG. 14 is a fragmentary, vertical sectional view of the screw of FIG. 12, illustrating the internal construction thereof;

FIG. 15 is a fragmentary, enlarged cross-sectional view of the screw of FIG. 12;

FIG. 16 is another fragmentary, enlarged cross-sectional view of the screw of FIG. 12;

FIG. 17 is a vertical sectional view taken along the line 17-17 of FIG. 14;

FIG. 18 is a vertical sectional view taken along the line 18-18 of FIG. 14; and

FIG. 19 is a schematic block diagram illustrating a processing system in accordance with the invention for the production of high-meat content pet foods.

DETAILED DESCRIPTION OF THE PREFERRED EMBODIMENTS

Figure 6:
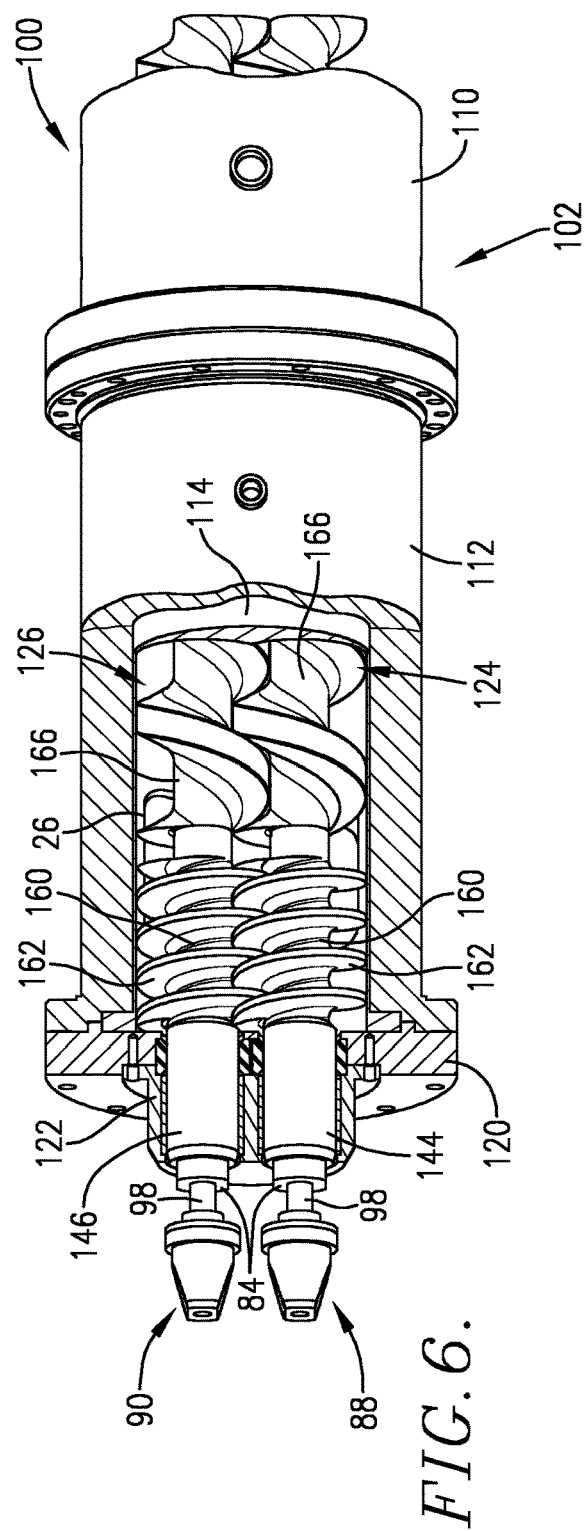
FIG. 6 is a fragmentary view with parts broken away of the forward end of another twin screw processing device in accordance with the invention, depicting the reverse flight sections of the twin screws.

Turning now to the drawings, and particularly FIGS. 1-5, a processing device 20 is illustrated. Broadly speaking, the device 20 includes an elongated, tubular barrel 22 having a material inlet 24 and an opposed processed material outlet 26, with a twin screw assembly 28 within the barrel 22

As illustrated, the barrel is made up of a plurality of end-to-end interconnected barrel sections 30, 32, 34, and 36. An internal liner assembly 38 is located within and extends along the length of the sections 30-36 and presents a pair of elongated, juxtaposed communicating arcuate passageways 40, 42, which receive the twin screw assembly 28. The sleeve further presents the rearmost opening 44, as best seen in FIG. 4. An apertured front wall 46 is located at the opposite end of the barrel and is secured thereto. Additionally, a forwardly projecting bearing housing 48 is attached to the outer face of front wall 46, and has a pair of side-by-side tubular bearings therein.

The twin screw assembly 28 includes identical, complemental first and second intermeshing, double-flight screws 50 and 52, which are designed to directionally co-rotate during the operation of device 20. Referring to FIGS. 2 and 4, it will be seen that the screws 50, 52 each have an elongated shaft 54 with outwardly extending, helical fighting 56 along the length of the shaft 54, having a pitch length of 1, based upon the screw diameter. An elongated central bore 58 extends substantially throughout the length of the shaft 54, thereby creating a hollow core 60 therein. As best seen in FIG. 3, the fighting 56 is divided into two sections, namely a first section 62 operable to convey material from the inlet 24 toward and through the processed material outlet 26, and a second section 64 operable to retard the flow of material therepast. To this end, the flighting sections 62, 64 are of reverse hand, respectively. The rearmost ends of the screws 50, 52 are provided with drive and bearing structure 66, 68, having rearmost, splined connector ends 70, 72; the ends 70, 72 are designed to mate with suitable drive structure (not shown) for axially rotating the screws. The forward ends of the screws are equipped with elongated extensions 74, 76, which are received within the tubular bearings of housing 48 (FIG. 3).

The screws 50, 52 are equipped with structure 78 to supply heat exchange media to the internal cores thereof. Specifically, elongated, stationary steam delivery tubes 80 and 82 extend from a point outside of housing 22 adjacent front wall 46 and into the bores 58. The tubes 80, 82 extend through the endmost tubular fixtures 84, 86 located at the forward ends of the extensions 74, 76. The outermost ends of the tubes 80, 82 connect with identical rotary unions 88, 90. Each such union includes a block 92 having a media inlet opening 94, a liquid removal outlet 96, and a rotatable sleeve 98 disposed about the corresponding tube 80 or 82. To this end, the sleeves 98 are secured to the corresponding tubular fixtures 84, 86.

The screws 50, 52 are preferably fabricated from metal using normal machining techniques, and are normally case-hardened.

In operation, material to be processed (which may be preconditioned, as explained hereafter) is delivered to inlet 24 during co-rotation of the screws 50, 52, which serves to advance the material during processing thereof to deliver processed material to outlet 26. During this operation, heat exchange media (normally steam) is directed from a delivery conduit (not shown) coupled with the media inlets 94 and into the tubes 80, 82 to the open cores 60 of the screws in order to provide thermal energy required for processing of the material. Additional energy input is provided by means of pressure and sheer conditions developed within the barrel 22. During processing, steam condensate passes from the cores 60 and through the sleeves 98, exiting the system via the removal outlets 96. In order to prevent leakage of material past the wall 46 and the fixtures 84, 86, the reverse flight section 64 comes into play by creating a retardation force against the flow of material created by the opposite hand fighting of the section 62. The product emerging from the outlet 26 may then be passed through a restricted orifice extrusion die and cut, in order to form the final product, although in practice, elongated delivery pipe is normally secured to the outlet 26 and a final die and knife assembly are located at the opposite end of the pipe.

Figure 7:
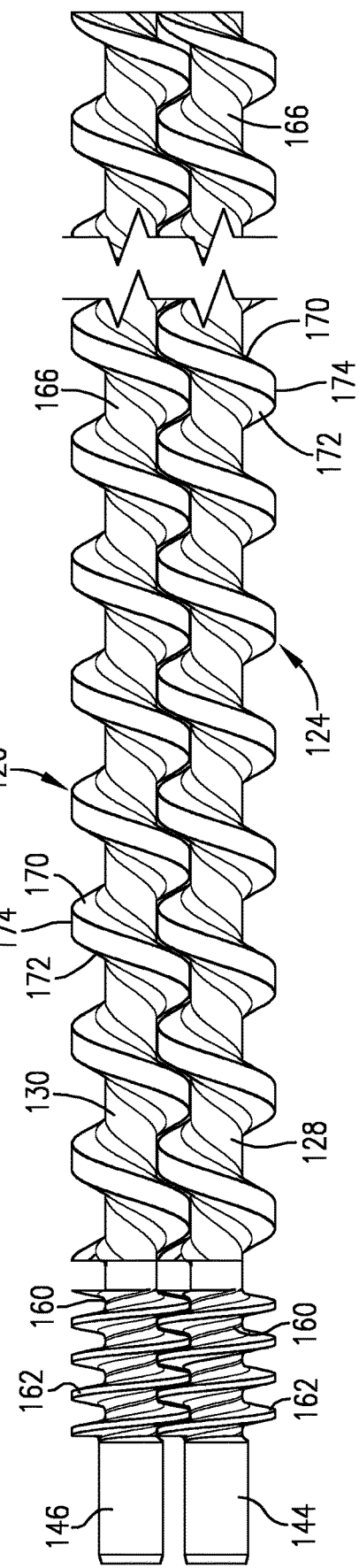
FIG. 7 is a fragmentary view of the twin screw assembly forming a part of the device of FIG. 6.

FIGS. 6-11 illustrate another embodiment of the invention, in the form of a processing device 100. The device 100 is in many respects similar to the device 20, having a tubular barrel 102 with a twin screw assembly 104 therein, and having an inlet 24 and an outlet 26, as in the case of the first embodiment. Again, the barrel 102 is made up of tubular, interconnected barrel sections 106-112 with an internal liner assembly 114 defining side-by-side passageways 116, 118.

The forward end of barrel 102 is equipped with a front wall 120, which supports a forwardly projecting bearing housing 122.

The screw assembly 104 has a pair of identical, intermeshed, single flight, helical screws 124, 126, which are received within the passageways 116, 118. Each of the screws has an elongated central shaft 128, 130, as well as outwardly extending helical fighting 132, 134 along the length thereof. As in the case of the first embodiment, the screws 124, 126 have rearmost drive and bearing structures 136, 138, equipped with splined drive connection ends 140, 142. The forward ends of the screws have bearing extensions 144, 146, which are received within the bearings of housing 122.

The principal differences between the first and second embodiments is the configuration of the helical screws 124 and 126. Specifically, each such screw includes a primary central section 148 operable to move product along the length of the barrel 102 towards and through the outlet 26, an inlet section 150 operable to deliver incoming material to the section 148, and a forward, material flow retarding section 152. The inlet section 150 is advantageously a machined part having a central shaft 154 with an internally splined bore 156, and outwardly extending fighting 132, 134. As best seen in FIG. 10, the bore 156 is designed to receive the forward end of the corresponding drive and bearing structure 136, 138. The screw sections 148 and 150 have a pitch length of 1, based upon the screw diameter, and denoted by D1 of FIG. 10. The forward section 152 of each screw is likewise a machined part and has a central, bored shaft 160 with outwardly extending helical fighting 162. Notably, the pitch of the flight 162 is opposite that of the pitch of the fighting 158 of screw section 148, and has a pitch length of 0.3, based upon the screw diameter, denoted by D2 of FIG. 10. Preferably, the pitch length D1 should be from about 0.4-1.2, more preferably 0.5-1.0, whereas the pitch length D2 should be from about 0.2-1.1, more preferably 0.3-1.

The central section 148 is preferably formed by casting (e.g., sand or investment casting) with a plurality of sections which are butt-welded together to form the entirety of the central section. As best seen in FIG. 10, the central section 148 has a central shaft 166, which is hollow along the length thereof to define a central core 167, as well as outwardly extending fighting 168, which is likewise hollow to define a helical core 169. In this regard, the flight 168 is defined by outwardly extending, opposed, spaced apart sidewalls 170 and 172, with a flattened outer wall 174. As such, it will be observed that there is a helical transition 176 between the innermost ends of the sidewalls 170, 172, which provides full, open communication between the central core 167 and the helical core 169, without any blockage or narrowing whatsoever; stated otherwise, the transition 176 presents an area which is open throughout the length and width thereof in order to afford unobstructed communication between the hollow regions of the shaft and helical screw. Inasmuch as the section 148 is of cast construction, it will be seen that the thickness of the shaft 166 is essentially identical with the thicknesses of the sidewalls 170, 172, and outer wall 174.

In preferred forms, the length of the central screw section 148 is at least about three times, more preferably at least about five times, greater than the length of the forward screw section 152.

The screws 124, 126 receive elongated media delivery tubes 178, 180, which are designed to deliver media such as steam to the interior of the screw sections 148 and 152. The forward ends of the tubes 178, 180 are received within rotary unions 88, 90, identical to those described in connection with the first embodiment, and like reference numerals have been applied (FIG. 10). The rotatable sleeves 98 are supported by couplers 84, again as described in the first embodiment.

The innermost ends of the tubes 178, 180 are each supported by a tubular, open-sided diffusion cage 182. The latter includes a mounting screw 184, which extends through the end of the primary screw section 148 and is received within a threaded bore 186 in the forward butt end of bearing and drive structure 136.

The rearmost end of the screw section 148 has a splined portion 188, which receives the forward end of the structure 136 ahead of inlet screw section 150. The forward end of the screw section 148 is secured to the rearward end of screw section 152 by butt welding or any other appropriate technique. Hence, driving rotation of the structures 136 serves to rotate the entire screws 124, 126.

The operation of device 100 is similar to the device 20. However, owing to the completely open hollow core structure of the screw section 148, better heat transfer from the injected steam is afforded, as compared with the device 20.

FIGS. 12-18 illustrate another hollow core screw embodiment of the invention in the form of helical extrusion screw 190. The screw 190 is designed for use in a twin screw extruder, so that a mating screw (not shown) will be used in conjunction with the screw 190 to make a screw set. Generally, the screw 190 includes an elongated central shaft 192 with a continuous helical flighting 194 along the length thereof.

The shaft 192 has a rearmost splined section 196 to afford a driving connection with a motor/gear reducer assembly, and a forward bearing extension. The shaft 192 is a machined, case-hardened part and has a solid rear section 198 and a hollow core forward section 200 presenting an elongated, axially extending, central core 202. The forward end of the core 202 is equipped with a coupler 204 designed to receive a rotary union 88 (FIG. 14). A stationary steam delivery tube 208 (shown fragmentarily in FIG. 14) extends substantially the full length of the core 202 and has an open end 210.

The fighting 194 includes a rear section 212 of relatively narrow flight width, which extends the full length of the solid section 198. Additionally, the fighting 194 has a wider flight width forward section 214 presenting an outermost flight surface 214a, which extends from the end of section 212 to a point close to the forward end of the shaft 192. However, as in the case of the earlier embodiments, the screw 190 has a reverse flight section 216 between the end of section 214 and coupler 204.

In the manufacture of the screw 190, the fighting 194 is machined as a solid protrusion from the shaft 192, with a continuous, helical, open-top groove 218 in the wide flight section 214, extending from the outermost flight surface 214a inwardly to an inner wall 220 close to the core 202. Thereafter, a series of spaced apart apertures 222 are formed along the length of the inner wall 220, in order to communicate the core 202 with groove 218. Next, a helical cover piece 224 is positioned over the upper end of the groove 218, and is welded to the fighting section 214. In the final step, the screw 190 is machined to provide the proper outside diameter for the fighting 194. This creates a unitary construction, as illustrated in the drawings.

The operation of the screw 190, with its mating, intermeshed screw within an extruder barrel, such as barrel 22, is the same as described in connection with the embodiment of FIGS. 1-5. That is, co-rotation of the screw set serves to advance material during processing thereof from the barrel inlet to the barrel outlet. Simultaneously, steam or other heat exchange media is directed into the core 202 through the union 88 and the extension of shaft 192 beyond the end of the extruder barrel. This media flows through the core 202 and groove 218 owing to the communicating apertures 222. This provides an increased level of thermal energy to the process. The reverse flight section 216 also serves to retard the flow of material at the forward end of the screw 190.

FIG. 19 schematically illustrates a system 226 for the production of high-meat content pet foods, and broadly includes an upstream preconditioner 228, and an extruder 230, the latter being a modified version of the devices 20 or 100, using any of the hollow core screws described above. In particular, the extruder 230 includes a generally L-shaped conduit or pipe 232 affixed to outlet 26 and having an endmost, restricted orifice extrusion die 234.

The system 226 is designed to produce products using mixtures of meat with other conventional pet food ingredients such as grains, starches, and fats, together with minor ingredients such as vitamins and emulsifiers. The meat content of the starting mixtures typically ranges from about 100-250% by weight, more preferably from about 125-200% by weight, based upon the weight of the dry ingredients taken as 100% by weight. During processing, the product should meet a minimum temperature of 90° C. in order to meet feed safety requirements. The rotation of the twin screws in the range from about 30-150 rpm, more preferably from about 30-65 rpm; pressure within the housing is normally from about 200-600 psi, more preferably from about 300-400 psi. Pressurized steam is directed into the hollow core screws usually at a level of 30-60 psi, more preferably about 45 psi. Although not illustrated in the drawings, it is possible to employ extruder barrels which are jacketed for receiving steam or other heat exchange media.

The preconditioner 228 may take a variety of forms, so long as the starting mixtures are heated and partially pre-cooked prior to delivery to the inlet 24; it is also possible to add moisture during preconditioning, but this is normally minimized or eliminated, owing to the high moisture content of the meat fraction of the mixtures. For example, it is possible to mix the dry ingredients in a conventional ribbon mixer or the like, followed by the addition of meat preheated to a temperature of from about 35-50° C. (more preferably about 45° C.) to the dry ingredients, with additional mixing. Alternately, use may be made of existing extrusion preconditioners, such as commercially available Wenger DDC or HIP preconditioners (see U.S. Pat. Nos. 4,752,139, 7,448, 795, and 9,028,133). Such preconditioners provide steam and/or water injection in order to heat and pre-cook the starting mixtures, or in some instances hot air may be used as a heating medium (U.S. Pat. No. 7,963,214). In such instances, it may be necessary to provide only a portion of the meat fraction of the mixture during passage through the preconditioner, with separate introduction of the remainder of the meat fraction directly into the input 24 of the processing device, along with the preconditioner materials, to achieve the desired total percentage of meat.

It will be appreciated that in extrusion technology there are two principal sources of energy input, referred to as specific mechanical energy (SME), and specific thermal energy (STE). SME is primarily derived from the heat, friction, and shear forces developed by the extrusion screw(s), whereas STE is generated by the addition of heat exchange media, typically steam. In existing extrusion technology, STE is most commonly added by means of direct injection of steam into the mixture being processed, either in the preconditioner, the extruder, or both. However, as indicated above, direct injection of steam can be problematical when high-meat recipes are being processed. The present invention provides a distinct improvement, in that indirect heating is achieved in the extruder, which avoids direct steam addition and the consequent excess moisture problems attendant thereto.

We claim:

1. A method of preparing a food product comprising the steps of:

passing a mixture of food ingredients into and through a food preconditioner operable to heat and at least partially pre-cook said food ingredients to create a preconditioned product;

passing said preconditioned product into a food extruder operable to further cook said preconditioned product, said food extruder having a barrel with a preconditioned product inlet, an extruded product output comprising a restricted orifice die, and a pair of elongated, fully intermeshed, axially rotatable screws with outwardly extending helical flighting along the length thereof, the flighting of the screws being fully intermeshed along the lengths thereof, said screws within said barrel and operable to move said mixture from said mixture input toward and through said restricted orifice die, said mixture including grain, starch, and fat, said screws each having a hollow core, and at least a portion of said helical flighting having an internal hollow helical region, said hollow core and region each configured to receive heat exchange media therein, said hollow core and said flighting portion in communication with each other; and during said step of passing the preconditioned product into the food extruder, rotating said screws and generating pressure within said barrel.

2. The method of claim 1, said mixture including meat, said meat present in the mixture at a level of from about 100-250% by weight based upon the weight of the dry ingredients taken as 100% by weight.

3. The method of claim 2, said meat being preheated to a temperature of from about 35-50° C., prior to said step of passing the mixture of food ingredients into and through the food preconditioner.

4. The method of claim 1, during said step of passing the preconditioned product into the food extruder, rotating said screws at a rate of from about 30-150 rpm and developing a pressure within said barrel of from about 200-600 psi, and directing heat exchange media into the hollow cores and hollow helical regions of said screws.

5. The method of claim 1, further comprising directing said heat exchange media into said hollow cores and allowing the heat exchange media to pass into said hollow helical regions.

6. The method of claim 5, said hollow cores and hollow helical regions being in communication through a series of spaced apart apertures, whereby said heat exchange media directed into said hollow cores passes through said apertures and into said hollow helical regions.

7. The method of claim 1, including the step of retarding the flow of said mixture within said barrel at a point proximal to said output.

8. The method of claim 1, said heat exchange media being steam pressurized to a level of from about 30-60 psi.

9. The method of claim 1, including the step of directionally co-rotating said screws within said barrel.

10. The method of claim 1, said food product being a pet food.

11. The method of claim 1, wherein said heat exchange media is delivered to said hollow cores via a media delivery assembly that includes a pair of media delivery tubes extending from a point outside of said barrel and respectively into a corresponding one of said hollow cores.

12. The method of claim 1, wherein each of said screws having a first helical flighting section, the first helical flighting section that conveys said preconditioned product from said barrel inlet toward and through said extruded product outlet, and wherein each of said screws has a second helical flighting section proximal to said extruded product outlet that retards the flow of preconditioned product therepast, said first and second helical sections being of opposite hand.

13. The method of claim 12, said second helical section being shorter than said first helical section.

14. The method of claim 12, said second helical section having a pitch length smaller than the pitch length of said first helical section.

15. The method of claim 12, said first helical section having a pitch length of from about 0.4-1.2 based upon the diameter of said first helical section, and said second helical section having a pitch length of from about 0.2-101 based upon the diameter of said second helical section.

16. A method of preparing a food product comprising the steps of:
   passing a mixture of food ingredients into and through a food preconditioner operable to heat and at least partially pre-cook said food ingredients to create a preconditioned product;
   passing said preconditioned product into a food extruder operable to further cook said preconditioned product, said food extruder having a barrel with a preconditioned product inlet, an extruded product output comprising a restricted orifice die, and a pair of elongated, intermeshed, axially rotatable screws with outwardly extending helical flighting along the length thereof, said screws within said barrel and operable to move said mixture from said mixture input toward and through said restricted orifice die,
   said mixture including grain, starch, and fat,
   said screws each having a hollow core, and at least a portion of said helical flighting having an internal hollow helical region, said hollow core and region each configured to receive heat exchange media therein, said hollow core and said flighting portion in communication with each other;
   directing said heat exchange media into said hollow cores and allowing the heat exchange media to pass into said hollow helical regions, said hollow cores and hollow helical regions being in communication through a series of spaced apertures, whereby said heat exchange media directed into said hollow cores passes through said apertures and into said hollow helical regions; and
   during said passing preconditioned product into a food extruder step, rotating said screws and generating pressure within said barrel.

17. A method of preparing a food product comprising the steps of:
   passing a mixture of food ingredients into and through a food preconditioner operable to heat and at least partially pre-cook said food ingredients to create a preconditioned product;
   passing said preconditioned product into a food extruder operable to further cook said preconditioned product, said food extruder having a barrel with a preconditioned product inlet, an extruded product output comprising a restricted orifice die, and a pair of elongated, intermeshed, axially rotatable screws with outwardly extending helical flighting along the length thereof, said screws within said barrel and operable to move said mixture from said mixture input toward and through said restricted orifice die,
   said mixture including grain, starch, and fat,
   said screws each having a hollow core, and at least a portion of said helical flighting having an internal hollow helical region, said hollow core and region each configured to receive heat exchange media therein, said hollow core and said flighting portion in communication with each other, wherein said heat exchange media is delivered to said hollow cores via a media delivery assembly that includes a pair of media delivery tubes extending from a point outside of said barrel and respectively into a corresponding one of said hollow cores; and
   during said passing preconditioned product into a food extruder step, rotating said screws and generating pressure within said barrel.

* * * * *